US008023155B2

(12) United States Patent
Jiang

(10) Patent No.: US 8,023,155 B2
(45) Date of Patent: Sep. 20, 2011

(54) IMAGING SYSTEM WITH QUALITY AUDIT CAPABILITY

(76) Inventor: Hubin Jiang, Great Falls, VA (US)

( * ) Notice: Subject to any disclaimer, the term of this patent is extended or adjusted under 35 U.S.C. 154(b) by 969 days.

(21) Appl. No.: 11/095,453

(22) Filed: Mar. 31, 2005

(65) Prior Publication Data

US 2006/0221402 A1 Oct. 5, 2006

(51) Int. Cl.
*G06K 9/00* (2006.01)
(52) U.S. Cl. ....... 358/3.22; 382/112; 382/135; 382/138; 382/139
(58) Field of Classification Search .......... 382/112, 382/124, 167, 270, 300, 286; 358/1.9, 1.2, 358/3.22, 527, 462, 461, 474, 3.27, 525
See application file for complete search history.

(56) References Cited

U.S. PATENT DOCUMENTS

| | | | | |
|---|---|---|---|---|
| 5,159,667 A | * | 10/1992 | Borrey et al. | 715/205 |
| 5,245,676 A | * | 9/1993 | Spitz | 382/235 |
| 5,309,526 A | * | 5/1994 | Pappas et al. | 382/237 |
| 6,310,984 B2 | * | 10/2001 | Sansom-Wai et al. | 382/289 |
| 6,345,130 B1 | * | 2/2002 | Dahl | 382/286 |
| 6,665,425 B1 | * | 12/2003 | Sampath et al. | 382/112 |
| 6,760,489 B1 | * | 7/2004 | Kuwata | 382/300 |
| 7,210,102 B1 | * | 4/2007 | Gordon et al. | 715/253 |
| 7,283,656 B2 | * | 10/2007 | Blake et al. | 382/137 |
| 2002/0063896 A1 | * | 5/2002 | Rogalski et al. | 358/1.18 |
| 2003/0225763 A1 | * | 12/2003 | Guilak et al. | 707/7 |
| 2005/0018252 A1 | * | 1/2005 | Jiang et al. | 358/403 |
| 2005/0040642 A1 | * | 2/2005 | Jiang | 283/81 |
| 2005/0157848 A1 | * | 7/2005 | Miyauchi et al. | 378/207 |
| 2005/0213805 A1 | * | 9/2005 | Blake et al. | 382/137 |
| 2005/0243378 A1 | * | 11/2005 | Klein et al. | 358/3.27 |
| 2005/0243379 A1 | * | 11/2005 | Klein et al. | 358/3.27 |
| 2006/0103899 A1 | * | 5/2006 | Wu | 358/504 |
| 2006/0153429 A1 | * | 7/2006 | Gehlen et al. | 382/118 |
| 2007/0253032 A1 | * | 11/2007 | Keydar et al. | 358/3.27 |

FOREIGN PATENT DOCUMENTS

| EP | 1403811 | * | 3/2004 |
|---|---|---|---|
| EP | 1422662 | * | 5/2004 |

OTHER PUBLICATIONS

Sato and Tominaga "facsimile service quality issue", Nov. 29, 1993-Dec. 2, 2003, IEEE, vol. 2, pp. 692-696(1-5).*
Dahlbom and Cheery "method for improving image quality", Nov. 2-9, 1991, IEEE, vol. 3, pp. 1587-1591 (1-5).*
Jacky et al., "numeric and symbolic data fusion" Jul. 18, 1996, Elsevier Science B.V, pp. 1361-1378 (1-18).*

* cited by examiner

*Primary Examiner* — Benny Tieu
*Assistant Examiner* — Haris Sabah
(74) *Attorney, Agent, or Firm* — Roberts Mlotkowski Safran & Cole P.C.

(57) ABSTRACT

In connection with the digitization of documents, a process and system wherein an automated quality control function operates to automatically determine the quality of an image according to predetermined characteristics and their associated values. According to this novel system and process, if an image fails to meet specified quality criteria it may be marked as such and that information as well as other information concerning the image will be made available during archival and thereafter including during a retrieval operation.

12 Claims, 7 Drawing Sheets

Figure 2

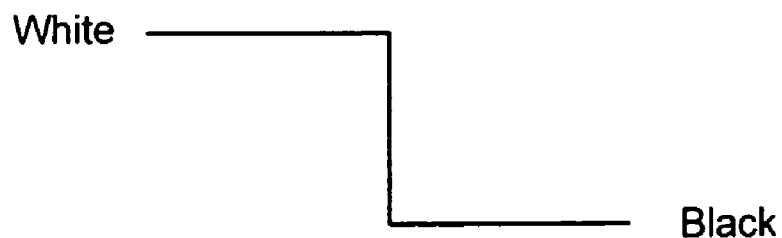
Example 1: Sharper edge, Hence the first derivative is greater.
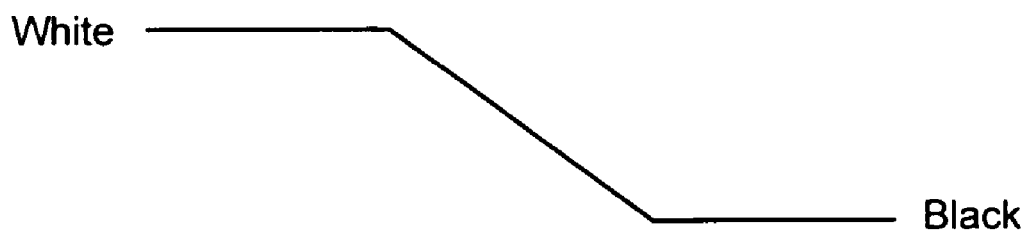
Example 2: Blurred edge, Hence the first derivative is smaller.
Figure 3

Dear Mortgagee

The HUD Handbook J(. 2000.4 REV.2 "Consolidated Audit Guide for Audits of HUD Programs" (Audit Gui·' ·vised August 25, 1997, requires each non-supervised mortgagee to provide copies of  ·l' statements audited and certified by an independent public accountant (IPA'  ꞌe auditor's report on the basic financial statements, the auditor shall report or  ·ternal control structure; (2) compliance with applicable laws and regulaꞌ  ˉ adjusted net worth. The financial statements and Audit Guide rꞌ  ꞌays following the end of the mortgagee's fiscal year, regarć  ꞌinated, serviced, purchased or sold FHA insured mortgaɡ.

According to  ꞌd/or Audit Guide reports for the subject fiscal year are i.  .y are not in compliance with the Audit Guide requirements.  mortgagee Review Board (Board) of the Department of Housing  ꞌonsidering administrative action against your company pursuant to seɩ.  .tional Housing Act, 12 USC 1808(c). Also, pursuant to 24 CFR Sectic  ʋy the Board will be based upon your failure to submit the financial statemer.  ꞌe reports as set forth above.

Figure 4a

Dear Mortgagee

The HUD Handbook I✓ 2000.4 REV.2 "Consolidated Audit Guide for Audits of HUD Programs" (Audit Gui⋯ ⬛ ⋯vised August 25, 1997, requires each non-supervised mortgagee to provide copies of ⬛ ⋅t⋅ statements audited and certified by an independent public accountant (IPA⋯ ⬛ ⋯ᵉe auditor's report on the basic financial statements, the auditor shall report or ⬛ ⋯ternal control structure; (2) compliance with applicable laws and regula⁺⋯ ⬛ ⋯ adjusted net worth. The financial statements and Audit Guide r⋯ ⬛ ⋯days following the end of the mortgagee's fiscal year, regarc⋯ ⬛ ⋯inated, serviced, purchased or sold FHA insured mortgag⋯

According to ⬛ ⋯d/or Audit Guide reports for the subject fiscal year are i⋯ ⬛ ⋯y are not in compliance with the Audit Guide requirements. ⬛ mortgagee Review Board (Board) of the Department of Housing . ⬛ considering administrative action against your company pursuant to sec⋯ ⬛ ⋯tional Housing Act, 12 USC 1808(c). Also, pursuant to 24 CFR Sectic ⬛ ⋯by the Board will be based upon your failure to submit the financial statemen⋯ ⬛ ⋯de reports as set forth above.

Figure 4b

IMAGING SYSTEM WITH QUALITY AUDIT CAPABILITY

BACKGROUND

1. Field of the Invention

The present invention relates generally to document imaging and processing and more particularly to systems and methods for digitizing documents and storing and accessing the same.

2. Background of the Invention

Even with the widespread use of computers in business and in daily life, the use of paper-based documents to record, communicate and store information remains exceedingly popular. Although software applications offer new and improved functions such as character recognition, managed document archival and retrieval and specialized image processing, many businesses can not leverage these capabilities because they maintain a significant amount of information in paper form rather than electronically.

Various other drawbacks are associated with business processes that involve storing large amounts of information in paper form as opposed to maintaining such information electronically. For example, pages can easily be lost or misplaced, large physical spaces may be required for storing the documents, and information may not be readily accessed through search applications which are available for electronically stored information.

In some contexts, even though information was originally created and stored using paper documents, conversion to electronic format via digitization is required for one or more reasons. For example, in the case of litigation, it is often necessary to store, access, produce and analyze a large number of documents associated with the particular dispute. In most cases, the overall business process associated with converting physical documents in various formats into digital form is error prone, costly and time-consuming.

One problem associated with the digitization of images, particularly in connection with jobs with large numbers of documents, is the manner in which images of poor quality are handled. By way of example, for a job wherein it is necessary to image one million documents or more, it is extremely likely that at least some of the original documents to be scanned will be of poor quality. It would be exceeding arduous if not impossible to require a worker to go through each document in the job to identify original images of poor quality and handle them on a case by case basis.

In fact, aside from the large amount of time necessary to do this, difficulties arise in terms of defining what criteria are to be used to classify an original image as of "poor quality" requiring a particular treatment. Even so, once an image is classified as being of poor quality, the desired treatment of that original image may vary depending on a number of factors including the content of the document, the extent to which image deficiencies exist, the physical location of the image within the overall job (e.g. which box it is in) as well as other factors. In summary, manually classifying and handling documents of poor image quality is a task that is difficult, if not impossible in connection with digitization jobs of any size other than very small jobs in terms of number of documents to be scanned.

The inability to classify and handle original documents of poor image quality can lead to a number of undesirable results associated with the digitization process. For example, if original documents which are of poor image quality are not identified as such during the scanning and archiving process, problems can occur at a later time. When a digitized document is later retrieved and it is unreadable or otherwise suffers from poor image quality, it will be unknown whether the poor image quality is due to an error or defect in the scanning and/or archiving process or whether the poor image quality is due to the original image being of poor quality.

As such, in order to deal with such a situation it is ordinarily necessary to go back and retrieve the physical original image (assuming it still exists and is available) to determine whether the original image is of poor quality or not. If it is, all of the effort necessary to retrieve the document will have been wasted since the digitized copy of the image will remain the best available image.

In addition to the problem of dealing with poor quality and/or unreadable digitized images, various aspects of the overall digitization task further complicate the process. For example, "paper-based" documents really represent many forms of physically stored information. This includes formats such as paper, microfilm and microfiche as well as other formats. Each of these formats generally requires its own, separate scanning device. Because of this, boxes of documents must be separated and fed into different scanning devices thus giving rise to the possibility that documents could be misplaced and/or the original document ordering could be lost.

Difficulties in maintaining document integrity and the original ordering also arise during other steps in the digitization business process. Boxes of documents and/or individual documents may be lost or caused to be out of order during pickup and/or transportation from the place where the documents are stored to the place where the documents are to be scanned. With typical digitization business processes, documents can also be lost or caused to be out of order during the time they reside at the scanning location and/or during the scanning process itself.

The lack of document integrity and the presence of poor quality images in connection with a digitization process is of even more vital concern in the case where the source documents are destroyed following imaging. Often times, imaging is performed for the primary purpose of consolidating space and physical storage requirements. In this case, documents are typically destroyed or, at least, stored off-site in a relatively inaccessible form following digitization. In this case, electronic document integrity is even more critical since the source documents no longer exist or are difficult to retrieve.

SUMMARY OF THE INVENTION

It is therefore a primary object of the present invention to provide a business process and methodology which improves upon prior art methodologies and their related drawbacks as described above.

It is an object of the present invention to provide a system and methodology for digitizing images wherein image quality issues can be handled on a predetermined and automated basis.

It is a further object of the present invention to provide such a system and methodology with the flexibility to selectively define the characteristics of "poor image quality" and handling of documents having such a classification.

It is a still further object of the present invention to provide a quality control function in connection with a digitization system and methodology wherein each scanned image has associated with it accountability information for use in processing the image during archival and later retrieval.

It is another object of the present invention to provide a business process and methodology which offers a higher level of assurance of document integrity resulting from the process.

It is a still further object of the present invention to provide a document imaging control system which operates according to the methodologies described above.

These and other objects of the present invention are obtained through the use of a novel business process and system wherein an automated quality control function operates to determine the quality of an image according to predetermined characteristics and their associated values. According to this novel system and process, if an image fails to meet specified quality criteria, it may be marked as such and that information as well as other information concerning the image will be made available during archival and thereafter including during a retrieval operation.

Various benefits accrue from the automated process of the present invention for associating particular information with each digitized image. For example, as referenced above, during the retrieval of a digitized image and when noting that such an image is of poor quality it can be immediately determined whether that poor quality is due to the original physical image being of poor quality or because an error occurred during the digitization process. In this way, it is not necessary to retrieve the original physical document to determine the cause of an unreadable or otherwise poor quality image.

Various novel aspects of the present invention include the use of algorithms in order to measure the image quality of the scanned document. The system of the present invention is flexible in that it can handle a variety of document image representations including, for example, binary and grayscale representations. Also, the preferred algorithms are designed to be of such a nature that they may be performed at a rapid pace so as not to inhibit the speed of the scanning and/or document archival process.

Additional capabilities associated with the document imaging system of the present invention include the ability to easily customize the system for use by various users and according to the preferences and requirements of various vendors. The system of the present invention may be deployed in a variety of environments including as an application service provider (ASP) solution, in a client server network or as a standalone software package.

These and other advantages and features of the present invention are described herein with specificity so as to make the present invention understandable to one of ordinary skill in the art.

BRIEF DESCRIPTION OF THE DRAWINGS

FIG. 2 is a sample image illustrating the methodology for pre-processing images for brightness detection according to a preferred embodiment of the present invention;

FIG. 3 is a diagram illustrating the methodology in which image sharpness is measured according to a preferred embodiment of the present invention;

FIG. 4a is a graphic illustration demonstrating segmentation of document blocks according to a preferred embodiment of the present invention;

FIG. 4b is a graphic illustration demonstrating the segmentation of missing areas in an image according to a preferred embodiment of the present invention;

DETAILED DESCRIPTION OF THE INVENTION

The present invention for document imaging and management with the novel features listed above is now described.

The present invention comprises a system for document imaging and management as well as a process therefor. In the description that follows, numerous specific details are set forth for the purposes of explanation. It will, however, be understood by one of skill in the art that the invention is not limited thereto and that the invention can be practiced without such specific details and/or substitutes therefor. The present invention is limited only by the appended claims and may include various other embodiments which are not particularly described herein but which remain within the scope and spirit of the present invention.

As described above, the present system provides document scanning and management with a quality control capability which allows for the accountability of each individual image within the job as well as a detailed revision history for each of the documents. According to the teachings of the present invention, the quality of each scanned image is automatically determined according to one or more set criteria and this data reflective of the quality of each image is stored with the image in the archived database. Many benefits can be achieved through this arrangement as is discussed in greater detail below.

Figure 1:
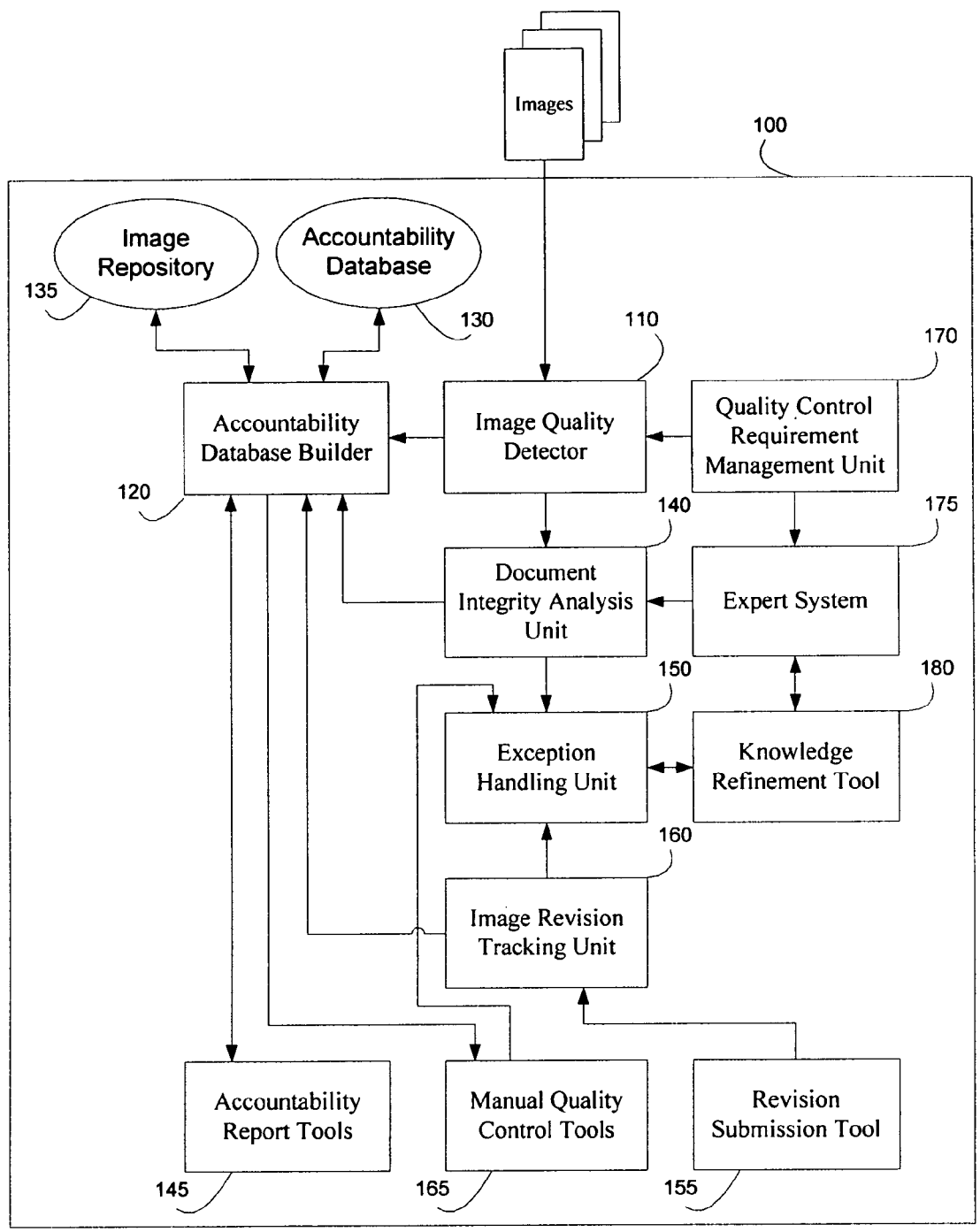
FIG. 1 is a block diagram illustrating the components of the system of the present invention in a preferred embodiment.

FIG. 1 is a block diagram of the system of the present invention in a preferred embodiment thereof. The various system components illustrated in FIG. 1 will be described in greater detail below. It will, however, be understood by one of ordinary skill that the configuration illustrated in FIG. 1 is merely exemplary and that the teachings of the present invention may be applied via various alternative embodiments. By way of example, although some of the features and algorithms of the present invention may be described as being associated with a particular component of the invention, the present invention may be similarly practiced with that particular function, feature or algorithm being associated with a different component while still falling within the scope and spirit of the present invention.

Turning now to FIG. 1, a description of the system 100 of the present invention and the specific components included thereon is now provided. Although not shown in FIG. 1, one or more terminals may be provided permitting one or more users to interact with system 100. Interaction may be in connection with a variety of activities as described herein including, for example, scanning operations, report generation and retrieval, image viewing and management, document set integrity analysis, image tracking and revision tracking as well as others. These terminals preferably include input and output capabilities including a keyboard, a mouse, a display screen and a local processor. As such, these terminals may be personal computers or alternatively, they may be dumb terminals without processing capability. Each of terminals may take a different form or they may be the same.

System 100 further preferably includes one or more scanners (also not shown) which read images and text on physical media and convert them to electronic form. These scanners are preferably capable of scanning a variety of media such as paper documents, microfiche, microfilm and other formats now known or hereinafter developed. Multiple scanners capable of reading the same format type may be included within system 100 to increase throughput. System 100 also preferably includes at least one barcode reader which is capable of reading barcodes or other printed codes.

System 100, according to the teachings of the present invention, has a number of primary functions. For example, system 100 checks the quality of images according to various criteria such as, but not limited to, brightness, contrast, blurriness, cropping, rotation, and skewing. In addition, system 100 checks the integrity of images as a grouped set. In this regard, system 100 looks for problems such as duplicated images, missing images, out-of-order images, mixed-up image sequences, improper bates number sequences as well as other integrity problems.

System 100 further preferably functions to build accountabilities associated with images and image groupings. Examples of such accountabilities include an indication of what quality problems are found with an image or set of images, who is to be notified when problems are found, an indication of when a solution addendum is received and a proposal for revising the problematic image, and whether or not an overall failure in image quality is due to the scanning process or some other external problem or an indication that the image is actually the best representation of the original. Each of these and other accountabilities and other data associated with scanned images and groupings of images and their related usage is described in greater detail herein.

System 100 of the present invention can be used in various contexts. For example, the system may be used in connection with an original scan from paper to digitized images. Alternatively, system 100 may be used to audit images that have been previously digitized and which may be provided by vendors and which may or may not have passed vendors' quality control processes.

The system of the present invention also provides a tool permitting users to track the document imaging status such as the quality roadmap of an image (discussed below), and to know immediately whether or not an original document page should be retrieved from a records center because of poor image quality. In fact, according to the teachings of the present invention, image quality can be so proved and controlled such that it can be clearly known and stated that each image within the digitized dataset is the best representation of its original. In this way, unnecessary physical retrievals for a better quality image via the original can be eliminated if it is known that the digitized image is the best possible representation of the original.

Returning now specifically to the components in FIG. 1 and the related process for processing images according to the present invention, images are input into system 100 via a scanning or other input device (not shown) as described above. Once scanned, the digital representation of the image is analyzed for image quality according to one or more selected quality metrics by Image Quality Detector 110. Image Quality Detector 110 operates according to a number of pre-selected and pre-configured algorithms to assess the quality of the scanned image. These "image quality assessment algorithms" are discussed in detail below.

For each scanned image, data representative of the results of these algorithms is processed by Accountability Database Builder 120 and stored in Accountability Database 130. The actual images themselves are stored in Image Repository 135. In this manner, as images are scanned, they are stored in a database while at the same time, data representative of the quality of that image is further stored and associated with that image. As would be obvious to one of skill in the art, Image Repository 135 and Accountability Database 130 may be one and the same. So long as images and the quality data associated with each of the images may be readily and easily accessed, the particular architecture of the database(s) is unimportant.

After each images has been processed by Image Quality Detector 110, it is next processed by Document Integrity Analysis Unit 140. Integrity analysis is performed only if desired and is typically used when document sets or groups exist. In this case, Document Integrity Analysis Unit 140 will check whether or not there are integrity problems with the image or the group of images. Document Integrity problems may include, for example, 1) duplicate images (e.g. when a piece of paper is scanned more than once); 2) Images out of order (e.g. when a document is scanned, the sequence of images should be the sequence of the original physical documents before they were scanned. However, during scanning, if a piece of paper is scanned before its previous pages are scanned, the sequence of the resulted images will be out of order); and 3) Missing Images (e.g. when multiple pages of a document are scanned into the scanner at one time, only the first page is digitalized into an image, therefore, missing images will occur).

Document Integrity Analysis Unit 140 detects those problems. For duplicate images problems, Document Integrity Unit 140 uses image matching algorithms such as convolution algorithms to find out whether or not two images are identical. For images out of order problems and missing images problems, Document Integrity Analysis Unit 140 works with Expert System 175 to resolve these issues. In this regard, a domain expert preferably teaches Expert System 175 the rules of document integrity. There are two primary categories of rules for document integrity, one is to understand the page numbers of a document, and another is to understand the features and characteristics of a document.

Images close to each other as a group should, in the normal case, carry similar characteristics such as background text, template style, header, footer, layout, etc. With knowledge stored in Expert System 175, Document Integrity Analysis Unit 140 queries the Expert System 175 to reason for each group of images, and reports the findings. There may be cases that a reasoning provides no results due to lack of knowledge about the group of images. Therefore, an exception may be sent to Exception Handling Unit 150 together with the group of images. At that point, the domain expert will have the opportunity to provide information to the Expert System 175 and refine the knowledge in Expert System 175 via the Manual Quality Control Tools 165 and Knowledge Refinement Tool 180.

In addition to information concerning scanned image quality, integrity data associated with an image or a set of images is also maintained as part of the overall accountability data associated with the images. In this respect, the output of Document Integrity Analysis Unit 140 concerning document integrity is also processed by Accountability Database Builder 120 and stored in Accountability Database 130. Again, this data is associated with a single image or set of images and is stored in the Accountability Database 130 in such a way that all accountability data associated with an image or set of images is easily and readily retrievable in association with the image or set of images with which it is associated.

Reporting capabilities are provided by system 100. As alluded to above, the accountability data stored in accountability database 130 may be retrieved and formatted into reports and other informational screens for viewing on, for example a video terminal or for printing out. For example, users may query accountability database using database tools known in the art in combination with the information stored in accountability database 130 in order to create a report of document integrity issues and/or document image quality issues associated with a single image or a set of images.

To the extent that document integrity issues are identified by Document Integrity Analysis Unit 140, system 100 may handle the mis-identification of document integrity or image quality via the capabilities of Exception Handling Unit 150. Document integrity analysis is performed in collaboration with Expert System 175. Document processing algorithms available through Document Integrity Analysis Unit 140 provide document image features and characteristics to Expert System 175 to perform reasoning. This reasoning is accomplished by Expert System 175 based on the knowledge rules established through Knowledge Refinement Tool 180. The results of the reasoning by Expert System 175 identify groups of document pages, groups of types of document pages, etc. Document Integrity Analysis Unit 140 follows the rules provided by Expert System 175 and performs feature extractions on the document page images with imaging processing and/or pattern recognition algorithms. Document Integrity Analysis Unit 140 also creates accountability and organizes and reports image integrity according to these reasoning results.

In a preferred embodiment, the analysis consists of 1) extracting features and characteristics of an image such as page number, page title, fonts of the page number and/or title, location of page number and title, etc. (Expert System 175 will provide guidance such as where to look at the page number and/or, what could be the page number and/or title, etc).; 2) providing the extracted features and characteristics to Expert System 175 in order to reason and determine which images carry the same features and characteristics, and are, therefore, to be assigned to a group; and 3) providing accountability and report information concerning the document image groups. There may be situations where an image can not be grouped because all defined features or characteristics are not found in the image, or Expert System 175 can not reach any reasoning results on an image. In these cases, the image or images are preferably reviewed manually by a document domain expert. These images along with their related information will be sent to Exception Handling Unit 150 waiting for operator's process. The Document Domain Expert will review the exceptions one by one. The Document Domain Expert may then study the image or images, and decide whether or not new features or characteristics should to be introduced into the system via new rules to be provided to Expert System 175 through Knowledge Refinement Tool 180. After these rules are refined and new feature extraction algorithms are set up, system 100 will be able to use these rules to process images having these characteristics next time.

In the event of either an integrity or quality problem as determined by document integrity analysis unit 140 or image quality detector 110, respectively, image revision may be undertaken via Revision Submission Tools 155. Changes made via Revision Submission Tools are processed through Image Revision Tracking Unit 160. Revisions to images are thereby tracked in Image Revision Tracking Unit 160 and the data associated with these revisions (such as type of revisions, quantity of revisions, date of revisions, who made the revisions, etc.) is passed to Accountability Database Builder 120 so that it may build and store relationships including issue and resolution data and related tracking data in Accountability Database 130 in association with one or more documents or set of documents stored in Image Repository 135. Manual Quality Control Tools 165 provide the means for a user to perform manual quality check on images.

System 100 performs image quality detection and document integrity analysis on images, and provides accountability reports. System 100 also provides levels of confidence data reflecting the quality of the detection and integrity analysis. Manual Quality Control Tool 165 is provided to allow an operator to confirm, for those images that have their levels of confidence lower than predefined threshold level, the proposed operation. Manual Quality Control Tool 165 also provides the means for an operator to perform manually checks on each image if needed. After an image or a batch of images are identified as being of low quality or bad integrity or are identified as of suspicious quality or integrity, the image or images can be returned to their providers for explanations or re-work.

Possible explanations can be, but are not limited to, 1) the image is the best representation of its original due to illegibility of the original; 2) the image is from other sources other than the original; etc. (re-work must take place if the image was not created well with its original). The explanations and re-work are submitted through Revision Submission Tool 155. This tool works in conjunction with Image Revision Tracking Unit 160 to ensure the vision control of the images and the accountability of what, when, who, where, why concerning the revision. Manual Quality Control Tool 165 can perform the same roles as the expert system based check. The difference is that it allows human manual intervention.

Data generated as a result of manual quality checks may be fed to Exception Handling Unit 150 for processing. The data associated with these quality control checks (such as the when, who, and where of the quality checks and what quality problems are checked, etc.) is passed to Accountability Database Builder 120 so that it may build and store these relationships in Accountability Database 130 in association with one or more documents or set of documents stored in Image Repository 135.

Also shown in FIG. 1, Quality Control Requirement Management Unit 170 manages requirements for image quality. This is accomplished through the selection of the image quality algorithms and related minimum thresholds and level of confidence to be used by Image Quality Detector 110 as described in greater detail below. Requirements may be dictated by a customer requirement and/or some other external factor(s). In particular, the requirements may include predefined selections, industrial standards, and/or government imposed standards. System 100 may also include Expert System 175 which may further include a knowledge base providing the necessary knowledge to perform document integrity analysis. Expert System 175 may function to "learn" from past processing or in other words, Expert System 175 may improve its control capability by obtaining feedback from other components of system 100 and adjusting its behavior based thereon.

In a preferred embodiment, Document Integrity Analysis Unit 140 works under the control of the Expert System 175. System 100 may also include Knowledge Refinement Tool 180, which provide interaction between system 100 and one or more operators to the refine knowledge contained within Expert System 175. As discussed above, when system 100 reports an unrecognized situation or system 100 makes an error in quality check or an exception occurs during the image revision process, an indication of this will be sent to Exception Handling Unit 150. Knowledge Refinement Tool 180 may be used to control how errors and exceptions are handled by Exception Handling Unit 150.

System 100 may also include one or more storage devices (not shown) which may also be employed to house Image Repository 135, Accountability Database 130 and/or other data storage requirements of system 100. These storage devices may comprise various devices such as personal computers, servers, disk drives, RAID storage arrays as well as other devices capable of storing relatively large amounts of data. Given appropriate capability for cataloguing and systematically accessing data stored on storage devices, users may access such data without the need for any additional physical storage media through the use of one or more of terminals as discussed herein.

Now that a general overview of system 100 has been provided, the following discussion focuses on specific exemplary functions and algorithms that may be implemented by Image Quality Detector 110 in determining whether or not scanned images meet certain pre-specified quality benchmarks. As will be understood by one of skill in the art, the following algorithms are merely exemplary and other algorithms, functions, image characteristics and associated benchmarks may also be used and/or substituted for those described herein without departing from the scope and spirit of the present invention.

In describing these image characteristics and the exemplary algorithms designed to analyze the image according to such characteristics it will be understood that the analyses set forth herein are performed on images following scan in their digital form according to one or more of many known file formats for storing and coding digital images. In connection with algorithm testing done in connection with this invention the following parameters were used:

Scanner parameters: Resolution is 300×300 (adjustable).
Letter size (8.5 inch×11 inch) (adjustable).
File Format is BMP, TIFF or Grayscale.

Additionally, it will be understood that grayscale images can be converted to binary images through thresholding if necessary. Hence algorithms discussed herein which were developed for binary images can also be applied to grayscale images. In the same way, binary images can be converted to grayscale images as is known in the art. Hence algorithms developed herein for grayscale images can likewise be applied to binary images. In most cases, whether in connection with testing the effectiveness and function of the algorithms or in connection with system implementation, the document image will go through a down-sampling process to obtain a much smaller image in order to speed up the processing.

There are nine exemplary algorithms used in evaluating image quality according to a preferred embodiment of the present invention. They are listed here and each is discussed in greater detail below:

1) Edge Cut—Detect whether or not contents of a document image are cut at edges. If so, which edge (assume there be 4 edges per document image);

2) Brightness—Define and model the levels of darkness and lightness. Detect the level of darkness and lightness of an image, and also report geographical area information concerning brightness;

3) Sharpness and Blurriness—Define and model the levels of sharpness and blurriness. Detect the level of sharpness and blurriness of an image, and also report geographical area information concerning sharpness and blurriness;

4) Missing Areas—Detect whether or not there are missing areas in an image. In some cases objects overlap the document page during the scanning process or some areas are cut by mistake during the refinement process;

5) Improper Rotation—Generally speaking, the top of the text or illustration should be the top of the image. Problems may arise with book illustrations that were printed landscape, or page scanned up-side-down. These should remain landscape. The orientation of the image should be the same as the orientation of the original;

6) Skewing—Determine if the image skews greater than 5 degrees when measured on the paper or on the "line". If so the image fails. The measurement can be taken with a protractor on the screen (this functionality is an image viewer utility) or printout;

7) Duplicate images—Reconcile that returned images documents from the contractor are not duplicate images. Version control will be incorporated to capture superseded images based thereupon;

8) Image out of order—Reconcile that returned imaged documents from contractor are in the same as the physical document submitted for conversion. The physical and image documents should be ordinal parallel;

9) Missing images—Reconcile the returned imaged documents from the contractor against the physical document submitted for conversion. The physical and image documents should parallel each other in appearance and volume.

Exemplary Image Characteristic #1—Image Cut at Edge

This function detects whether or not the contents of a document image are cut at one or more edges. If so, it is determined which edge is cut. It is assumed that there should be 4 edges per document image.

Steps:

1. If the image is black-white image, go to STEP 2, otherwise, convert the image into a black-white image by using thresholding which is available via various commercially available software or tools such as, for example, MATLAB which is available from The Mathworks in Natick, Mass.

2. Look into each edge of an image, if computer finds any black, then an edge may have content cut.

Based upon the above, system 100 in general and Image Quality Detector 111 in particular, will notify Accountability Database Builder 120 of this finding and the Accountability Database 130 will store this image quality data and associate it with the subject image.

Exemplary Image Characteristic #2—Brightness

Define and model the levels of darkness and lightness. Detect the level of darkness and lightness of an image, and also report geographical area information.

Steps:

1. If the image is grayscale image, go to STEP 2, otherwise convert the image into grayscale by using commercially available software or tools such as MATLAB.

2. Use thresholding algorithm to eliminate the image background.

Figure 2:
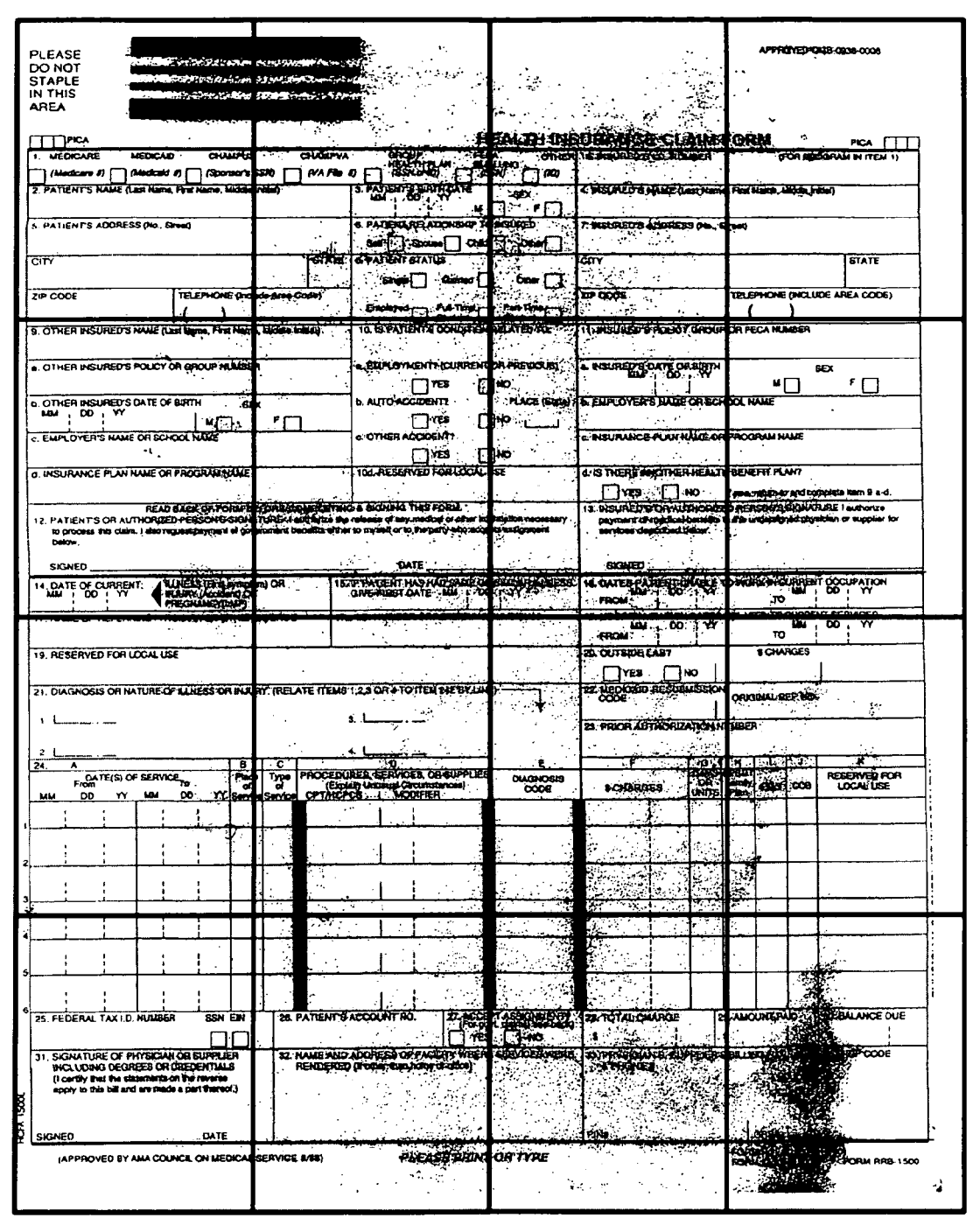

3. Divide the document image into non-overlapping blocks. Block size can be adjusted according to the requirements. In the example shown in FIG. 2, there are 16 blocks in the image, as shown in Table 1.

4. In each block, calculate the mean value of the foreground. The mean value is the average level of the foreground pixels in each area of the 16 areas. This mean value is used to measure the brightness and darkness. The larger the mean value is, the brighter that block is.

Mean values of these Figures are shown in Table 1. It can be seen that from the mean value that we can clearly distinguish which one is black and which one is bright.

TABLE 1

| Block organization | | | |
|---|---|---|---|
| 1 | 2 | 3 | 4 |
| 5 | 6 | 7 | 8 |
| 9 | 10 | 11 | 12 |
| 13 | 14 | 15 | 16 |

TABLE 2

| | Block | | | | | | | |
|---|---|---|---|---|---|---|---|---|
| | 1 | 2 | 3 | 4 | 5 | 6 | 7 | 8 |
| Mean value | 2.0 | 1.3 | 1.1 | 8.2 | 1.4 | 1.5 | 4.0 | 2.3 |
| | Block | | | | | | | |
| | 9 | 10 | 11 | 12 | 13 | 14 | 15 | 16 |
| Mean value | 1.5 | 1.6 | 1.6 | 1.8 | 1.4 | 1.6 | 1.7 | 1.1 |

The information in Table 2 or its equivalent may be stored with the particular image or an overall value for "brightness" based upon the overall table results may be stored with the image or both may be stored. As with other algorithms used herein, the individual table values or a collective mean or some other calculated value may be compared against a threshold value. If the value is met or exceeded, the image may be tagged as "of good quality". On the contrary, if the minimum threshold is not met, the image may be tagged as having "poor image quality".

Exemplary Image Characteristic #3—Sharpness and Blurriness

Define and model the levels of sharpness and blurriness. Detect the level of sharpness and blurriness of an image, and also report geographical area information;

Steps:
1. If the image is binary, a known algorithm is applied to get the grayscale image.
2. Then thresholding is used to eliminate the image background.
3. Divide the document image into non-overlapping blocks as explained above with respect to the brightness algorithm.
4. In each block, for each foreground pixel, calculate the first derivative in vertical and horizontal directions. The first derivative can be used to measure the sharpness. This concept is illustrated in FIG. 3.
5. Calculate the mean value of those first derivatives in each block. The larger of the mean value, the sharper that block is.

An exemplary table containing sharpness values for each of 16 blocks for an image is shown in Table 3.

TABLE 3

| | Block | | | | | | | |
|---|---|---|---|---|---|---|---|---|
| | 1 | 2 | 3 | 4 | 5 | 6 | 7 | 8 |
| Mean value | 3.0 | 3.7 | 3.6 | 4.7 | 3.3 | 3.6 | 0 | 2.7 |
| | Block | | | | | | | |
| | 9 | 10 | 11 | 12 | 13 | 14 | 15 | 16 |
| Mean value | 3.4 | 3.4 | 2.9 | 1.9 | 3.7 | 3.7 | 3.6 | 3.5 |

The information in Table 3 or its equivalent may be stored with the particular image or an overall value for "sharpness" based upon the overall table results may be stored with the image or both may be stored. As with other algorithms used herein, the individual table values or a collective mean or some other calculated value may be compared against a threshold value. If the value is met or exceeded, the image may be tagged as "of good quality". On the contrary, if the minimum threshold is not met, the image may be tagged as having "poor image quality".

Exemplary Image Characteristic #4—Missing Areas

Detect whether or not there are missing areas in an image. The problem happens usually because some objects overlap the document page during the scanning process or some areas are cut by mistake during the refine process.

Steps:
1. First thresholding is applied to obtain the binary image.
2. Segmentation is applied to obtain the bounding box for each paragraph in the document. See FIG. 4a.
3. In the different paragraph blocks, find the white pixels whose neighborhood does not have black pixels. See FIG. 4b.
4. If the number of marked pixels is above some predefined threshold, we can conclude that there are some missing areas in the image.

If an image is determined to contain a missing area, the image may be tagged as having "poor image quality".

Exemplary Image Characteristic #5—Improper Rotation

Generally speaking, the top of the text or illustration should be the top of the image. Book illustrations that were printed landscape should remain landscape. The orientation of the image should be the same as the orientation of the original.

Figure 5A:
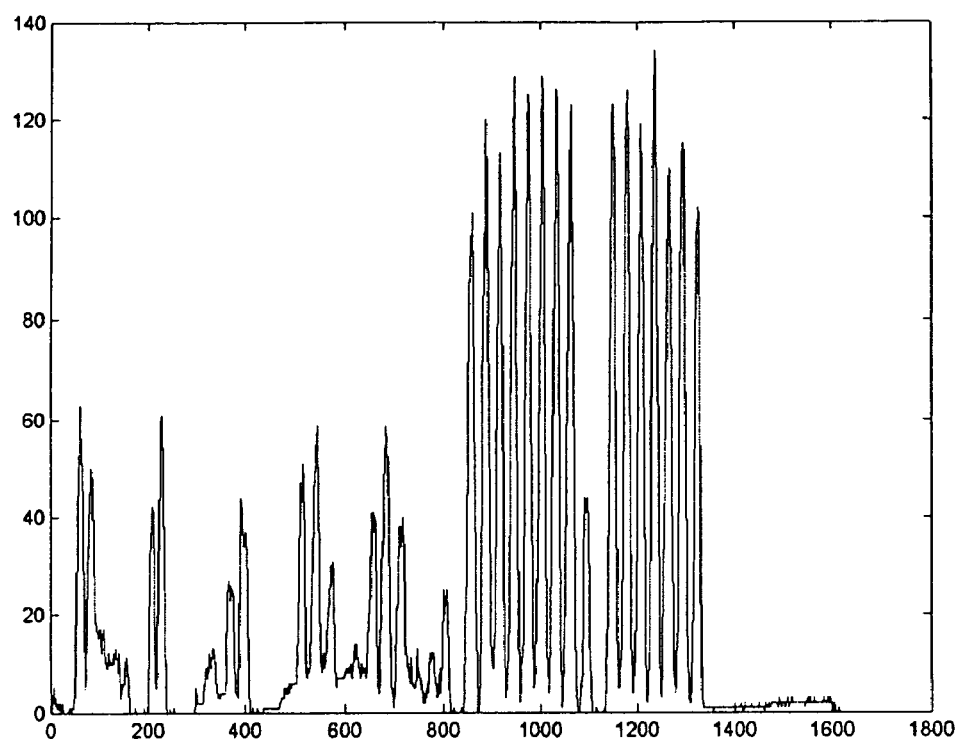
FIG. 5a is a graph illustrating a landscape projection profile of an image.
Figure 5B:
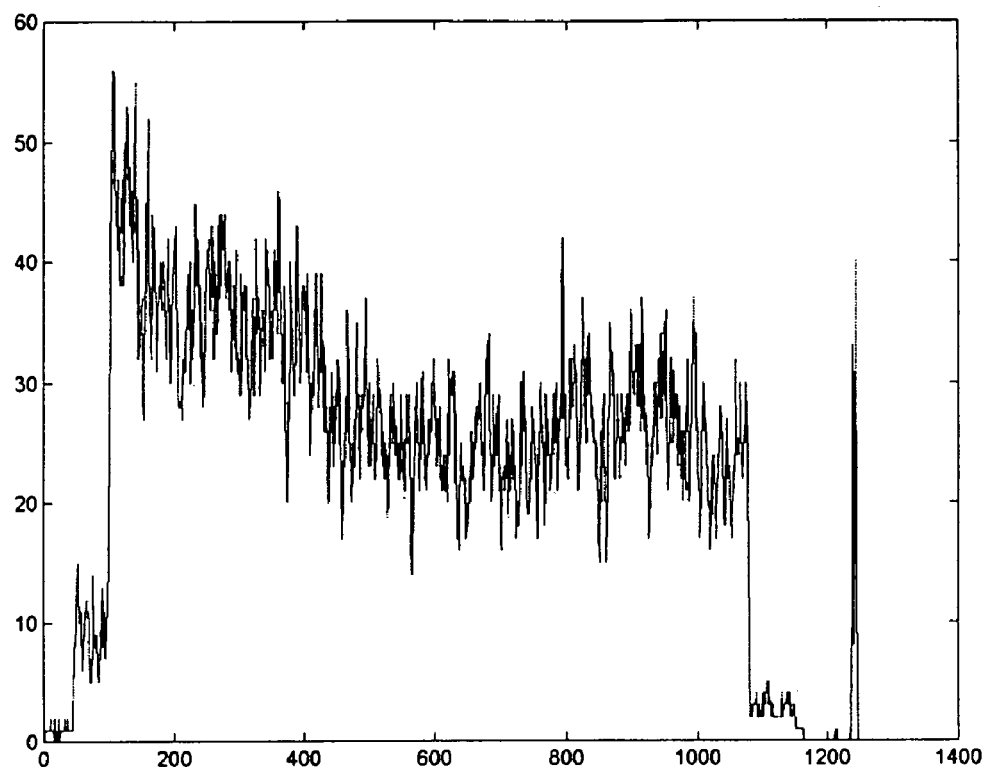
FIG. 5b is a graph illustrating a portrait projection profile of an image.

Steps:
1. First, the bounding box for each text paragraph is determined. The figures and tables are not considered in the following processing. Each paragraph will be processed as independent unit.
2. Then thresholding is applied to get a binary image.
3. Project the black points to the X axis and Y axis to get two projection profile, as shown in FIGS. 5a and 5b.
4. Calculate the standard deviation of these two projection profiles, as shown in the following Table 4. The orientation with the larger standard deviation is the correct orientation.

TABLE 4

| Orientation | Landscape | Portrait |
|---|---|---|
| Standard deviation | 31.2 | 12.9 |

5. After determining the correct orientation (landscape or portrait), system 100 next determines if the top-bottom is reversed. An Optical Character Recognition (OCR) function is used to read characters from two directions (top to bottom, and bottom to top). The direction with larger character recognition rate is the correct direction.

Exemplary Image Characteristic #6—Skewing

In this analysis, system 100 determines if the image skews greater than 5 degrees when measured on the paper or on the "line", if so the image fails. The measurement can be taken with a protractor on the screen (this functionality is an image viewer utility) or printout.

Steps:
1. First, the bounding box for each text paragraph is determined. The figures and tables are not considered in the following processing. Each paragraph will be processed as independent unit.
2. Then thresholding is applied to obtain the binary image.
3. Skew the image in different angles. The search scope may be, for example, from −10 to 10 degrees with the step size of 0.5 degree.
4. Project the image in the horizontal direction and obtain the different projection profiles.
5. Calculate the mean value of absolute difference value in the neighboring bins, as shown in Table 5. This table shows that the histogram peak is corresponding to the skew angle.
6. In order to save search time, a modified method may alternatively be used. For each character, first the bounding box is found. Then each midpoint of the bottom of the bounding box is used to represent the whole bounding box. The projection profile of these midpoints is used to search the skew angle.

TABLE 5

| | Skew angle (degree) | | | | | | | | | | |
|---|---|---|---|---|---|---|---|---|---|---|---|
| | −5 | −4 | −3 | −2 | −1 | 0 | 1 | 2 | 3 | 4 | 5 |
| Mean value | 1.86 | 1.84 | 2.13 | 2.47 | 3.03 | 8.68 | 2.73 | 2.48 | 2.20 | 1.72 | 1.87 |

Exemplary Image Characteristic #7—Duplicate Images

In this case, system 100 reconciles that returned image documents from the contractor are not duplicate images. Version control is incorporated to capture superseded images based thereupon.

Steps:
1. First, system 100 determines whether there is a need to compare images. If there is, for example, an issue with skew angle, shift, noise, etc., the problem must be addressed.
2. Then thresholding is applied to get the binary image. For example, assuming pixels A and B are in the corresponding place for both the previous and present image. If point A and B are same, the output is 1. If point A and B are different, the output is 0. This is equivalent to X=! (A XOR B).
3. Scan the whole both images. Assume sum=all added output. Num=the total number of the image. Average=sum/num.
4. If the average number is 1, then both images are identical. If not, they are different. If the average number is closer to 1, that means both images are more similar. We can set a threshold (e.g. 0.95) to judge if both images are similar.
5. For the following two images, the average value is only 0.45. In this case, with the threshold set where it is, it will be determined that the images are different and a duplicate does not need to be removed.

Exemplary Image Characteristic #8—Image Out of Order

According to this characteristic, system 100 reconciles that the returned imaged documents from the contractor are the same as the physical document submitted for conversion. The physical and image documents should be ordinal parallel.

Exemplary Image Characteristic #9—Missing Images

System 100 reconciles the returned imaged documents from the contractor against the physical documents submitted for conversion. The physical and image documents should parallel each other in appearance and volume. With both the missing images function and the image out of order function, system 100 relies on Expert System 175 and Document Integrity Analysis Unit 140. Both are addressed using the following steps.

Steps:
1. First, in Document Integrity Analysis Unit 140, the bounding box for each text paragraph is determined. The figures and tables are not considered in the following processing. Each paragraph will be processed as independent unit.
2. Then thresholding is applied to get a binary image. STEPS 1 and 2 are pre-processing for feature extraction.
3. There are rules saved in Expert System 175, which tell what may be page numbers and where are the places in which page number may be. There may be other features such as titles, form identifications, etc. rather than page number. But, the work theory and method are similar to the page number. According the rules, Document Integrity Analysis Unit 140 performs feature extraction. Since page numbers are usually on the bottom or top of the page, we will pay more attention to these two parts. For those bounding boxes in the top and bottom of the image, Document Integrity Analysis Unit 140 uses commercially available Optical Character Recognition (OCR) software or tools to recognize the character.
4. In cases of recognized text, any numerical character and keyword 'page' are searched. If keyword 'page' is found, the following number is treated as sequence number. If only the numerical character is found, this number and the corresponding coordinate are saved for further processing.
5. On the next page, the same procedures are repeated. If in the same coordinate, the numerical character is found again. This new number is compared with the number in the previous page. If the number is in the ascending order, then these numbers are treated as sequence number, as shown in Table 6.

TABLE 6

| | Previous Page | Present Page |
|---|---|---|
| Recognized numbers on top and bottom parts | 31, 2000, 9 | 31, 2000, 10 |
| Sequence number | 9 | 10 |

6. Besides the top and bottom of the page, for those bounding box in the central part of the image, OCR tool is also applied. Right now only keyword 'page' is searched. If keyword 'page' is found, the number following it is also treated as sequence number.
7. If system 100 finds a greek number, such as I, II, IV, etc, the program will automatically transfer them into the normal number, 1,2,4, etc.
8. After the sequence number is determined, if those numbers are out of order or miss some number, system 100 determines that the images are out of order or that there are missing images by providing location information of a page number, kind of fonts and size, page numbers, etc. to Expert System 175 for reasoning.

Returning now to FIG. 1, a more detailed discussion of additional components of system 100 is now provided. As discussed above, Image Quality Detector 110 uses algorithms to detect image quality problems. However, in the case of most of the algorithms, this functionality works on the basis of each individual document image. In other words, Image Quality Detector 110 provides image quality analysis for individual documents without considering the relationships of that document to its previous and next image pages.

As a result of the digitization process, there are situations such as "images out of order or sequence", "missing images", etc., which require document analysis on images in a group. These types of issues are identified using the corresponding functions discussed above in connection with image analysis. Performing analysis only on an isolated image without considering its relationships with other images will not solve these types of problems. System 100 employs a knowledge-based expert system comprising the expert system component 175, the quality control requirement management unit component 170, document integrity analysis unit 140 and the knowledge refinement tool component 180 in order to achieve the desired goal.

In order to assess a majority of the problems that may exist within a document set, images must be analyzed both individually and with respect to other documents within the document set. The following discussion focuses on this latter aspect of the document digitization process according to the teachings of the present invention.

Document Integrity Analysis Unit 140 segregates an image into many candidate characteristic document segments. Many of these algorithms for image segmentation are commercially available such as image segmentation tools, image binarization tools, image processing tools, etc. Once the job is segmented, each segment is assigned a segment ID and requests for values of certain parameters are initiated. For example, system 100 can request return of page number if recognized as a page segment. Those candidate segments can then be applied with Optical Character Recognition (OCR) algorithms, and text contents of those segments will be extracted. For segments containing a graph or a picture, the OCR will fail to extract contents, therefore, pattern recognition algorithms will be applied to establish a specific pattern for each and every such segment.

Each specific pattern belongs a category. A category is called a Pattern Type. A specific pattern of a segment can be categorized as a Pattern Type plus its Delta Characteristics. The Delta Characteristics are the features that make that specific pattern slightly different from others in the same Pattern Type. Therefore, the specific pattern of a segment is also called a Pattern Instance. Contents and/or Pattern Instances of a segment are called features of the segment. Features of each candidate segment will be sent to Expert System 175 for reasoning in order to recognize and validate the segment. For example, Document Integrity Analysis Unit 140 picks up a segment, and determines its features, but is not aware of whether or not the segment is a title segment or a page segment. Document Integrity Analysis Unit 140 sends the segment (identified with its Segment ID) along with its features to Expert System 175.

Expert System 175 possesses document analysis knowledge permitting it to recognize the title segment and page segment, and outputs the definition of the segment with output value of parameters defined and requested in the segment. Expert System 175 is able to do this because a user has previously provided Expert System with rules concerning how a document should be classified. The rules, must be set up according to an expert system's specification so the expert system can understand the rules. Then, provided with facts required, Expert System 175 will reason according to the rules, and conclude the results.

A segment can be classified and defined as title segment, graph segment, text segment, page number segment, or others by Document Integrity Analysis Unit 140 and Expert System 175. Each image of a group will receive document segmentation analysis first, then according to their segments and features, Expert System 175 will reason the relationships among all the images. Integrity of the group of the images is determined by Document Integrity Analysis Unit 140 and Expert System 175. Sub-groups of images, if any, are determined according to a image group. Each sub-group is treated respectively and separately. After the sub-groups are determined and pages or sequences of images (if pages are not presented on images may be determined. Problems such as "images out of order or sequence" and "missing images" are then reported to Accountability Database Builder 120.

Expert System 175 fires rules to make decisions. The set of collective rules are knowledge. The set of collective knowledge is represented in the knowledge base of expert system 175. The knowledge base of the system 100 is developed by analyzing many images and image groups. First, documents that represent a type of document are scanned into images. Segments representing a Pattern Type are selected. Features of a segment are decided by applying OCR or feature extraction algorithms to the segment. A Pattern Type will then be defined with as many features as found. The Pattern Type with features will be stored in the knowledge base. A human operator may then write rules as to how a segment belongs a Pattern Type. For example, to recognize a page segment, a rule may be, IF a feature in the segment is text PAGE and another feature next to the PAGE is a numerical number THEN this segment is a page segment with a VALUE of the PAGE equal to "Page Number".

There are many other rules that also reason the segment as a Page Segment, for example, a page number can be alphabetical characters such as a, b, c, etc. or Greek numerical number such as I, II, III, etc. Similar rules are established in the knowledge base of system 100. Delta Characteristics can be segment measurement, angles, etc. and may or may not be part of the Pattern Type. The more images that are analyzed by the expert, the better performance system 100 can offer. After a knowledge base is established, Expert System 175 can use the knowledge base to reason segments in a image group and complete document analysis. Expert system 175 can be one of those commercially available such as the one known commercially as "CLIPS".

If a situation is not recognized or analyzed due to the new document type, pattern type, segment type, new features, or other previously unknown, Document Integrity Analysis Unit 140 may then report an exception to Exception Handling Unit 150. A human expert can then use Knowledge Refinement Tool 180 to refine the knowledge base and create new knowledge or modify the existing knowledge.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A computer implemented, expert-system-based, automated document quality control methodology, the expert system comprising a knowledge base and rules to perform reasoning, said methodology comprising the steps of:

determining image quality for a plurality of images forming a document via an image quality detector, the image quality detector employing a plurality of algorithms to assess image quality, selecting one or more algorithms from the plurality of algorithms using the expert system's reasoning knowledge and initiating the selected algorithms with parameters and configuration settings provided by the expert system;

executing the selected algorithms to assess image quality wherein image quality is represented by a quality value and a level of confidence that reflects, at the level of confidence, whether each of the plurality of images meets one or more quality requirements determined by the expert system;

segregating each of the plurality of images into document characteristic segments using one or more image segmentation algorithms of a document integrity analysis unit;

determining and classifying image features and characteristics of the document characteristic segments using of the expert system's document analysis knowledge;

reasoning relationships among the plurality of images forming the document via the expert system;

providing recursively the document image features and characteristics to the expert system to perform reasoning that assesses, at a level of confidence, whether one or more integrity problems exists within a sub-grouping of the scanned images;

identifying scanned images of a poor quality or having at least one integrity problem via the expert system;

tracking a quality roadmap of each image from the plurality of images forming the document, the quality roadmap built by the image quality detector and document integrity analysis unit, which provide quality values with levels of confidence and integrity results with levels of confidence determined using image quality assessment algorithms; and storing the quality roadmap in an accountability database.

2. The methodology of claim 1 further comprising the steps of assigning accountability data via said accountability database builder to at least one cause of a failure to meet said predetermined quality requirement wherein said accountability data is indicative of at least one solution to solving said failure to meet said predetermined quality requirement.

3. The methodology of claim 1 wherein said integrity problems and solutions therefore are stored.

4. The methodology of claim 1 wherein said integrity problems comprise at least the presence of duplicate images.

5. The methodology of claim 1 wherein said integrity problems comprise at least the presence of images out of order.

6. The methodology of claim 1 wherein said integrity problems comprise at least the presence of at least one missing image.

7. A computer implemented, expert-system-based, automated document quality control system, said system comprising:

an expert system comprising a knowledge base having a set of knowledge rules, said knowledge rules employed to perform reasoning based on said knowledge rules, wherein the set of knowledge includes knowledge to select algorithms, knowledge to decide initial parameters and configurations for the selected algorithms, knowledge to determine targeted quality and integrity requirements and values, knowledge to synthesize and combine results from executed algorithms, knowledge to make quality and integrity decisions, knowledge to guide extraction of features and characteristics, knowledge to analyze integrity of images, and knowledge to control said system and operations;

an image quality detector for receiving a plurality of images forming a document, said image quality detector configured to i) determine image quality for the plurality of images forming a document through the use of a plurality of algorithms to assess image quality, ii) select one or more algorithms from the plurality of algorithms using the expert system's reasoning knowledge, iii) initiating the selected algorithms with parameters and configuration settings provided by the expert system; and executing the selected algorithms to assess image quality wherein image quality is represented by a quality value and a level of confidence that reflects, at the level of confidence, whether each of the plurality of images meets one or more quality requirements determined by said expert system;

a quality control requirement management unit coupled with said image quality detector and said expert system for managing the requirements for image quality through the selection of image quality algorithms and related minimum thresholds and levels of confidence for use by said image quality detector;

an accountability database builder;

an image repository coupled to said image quality detector via said accountability database builder for storing the scanned images;

a document integrity analysis unit coupled to said image quality detector and said accountability database builder and said expert system and capable of i) executing algorithms specified by said expert system, with initial parameters and configurations specified by said expert system, ii) extracting features and characteristics from images by following instructions of where and what to extract provided by said expert system, and iii) providing extracted features and characteristics to said expert system;

an image revision tracking unit in cooperation with said accountability database builder and an exception handling unit for processing image changes made via a set of revision submission tools;

wherein said expert system determines whether one or more document integrity problems exist with an image or sub-group of images or group of images, by reasoning knowledge with extracted features and characteristics, and identifies scanned images of poor quality or those having at least one integrity problem;

wherein said accountability database builder coupled to said image quality detector and said document integrity analysis unit stores in an accountability database data representative of a quality roadmap and integrity results with levels of confidence reported through said image quality detector and said document integrity analysis unit; and wherein revisions to images are tracked within said image revision tracking unit, with data associated with such revisions passed to said accountability database builder to build and store relationships including issue and resolution data and related tracking data in an accountability database in association with one or more documents or set of documents.

8. The system of claim 7 wherein one of said document integrity problems comprises an image out of order situation.

9. The system of claim 7 wherein one of said document integrity problems comprises a missing image situation.

10. The system of claim 7 wherein said accountability database builder assigns accountability data to at least one cause of a failure wherein said accountability data is indicative of at least one solution to solving said failure.

11. The system of claim 7 wherein said integrity problems and solutions therefore are stored.

12. The system of claim 7 wherein said integrity problems comprise at least the presence of duplicate images.

* * * * *